March 29, 1966 H. F. WELSH 3,243,580

PHASE MODULATION READING SYSTEM

Filed Dec. 6, 1960 2 Sheets-Sheet 1

INVENTOR.
HERBERT F. WELSH

BY Edward M. Farrell

ATTORNEY

PHASE MODULATION READING SYSTEM

Filed Dec. 6, 1960

INVENTOR.
HERBERT F. WELSH
BY Edward M. Farrell
ATTORNEY

United States Patent Office 3,243,580

Patented Mar. 29, 1966

3,243,580

PHASE MODULATION READING SYSTEM

Herbert F. Welsh, Philadelphia, Pa., assignor to Sperry Rand Corporation, New York, N.Y., a corporation of Delaware Filed Dec. 6, 1960, Ser. No. 74,112
13 Claims. (Cl. 235—61.11)

This invention relates to a phase modulation system, and more particularly to a phase modulation system for reading binary information from a recording medium.

In many computer systems, binary information signals are recorded on a recording medium, such as a magnetic drum or tape. Such binary signals, having one of two different characteristics, may represent a "1" or a "0". A signal representing a "1", for example, may be represented by an alternating signal having a first form for the first half of its digit period and a second form for the second half of its digit period. Likewise, a "0" may be represented by a signal which is in the second form for its first half of its digit period and the first form for the second half of its digit period. Both types of signal may be considered as passing through zero in going from one level to another at the middle of their digit periods.

It is this so called zero crossing point which is utilized in many phase modulation systems to produce pulse signals representing a "1" or a "0". By detecting the direction in which the binary signal is going at the zero crossing point, the nature of the signal, i.e. whether it is a "1" or a "0", may be determined.

One of the chief advantages which may be derived from a phase modulation system which uses zero cross over points to determine the nature of the information signal is that recorded sprocket or clock signals are not necessary to recover the information signals. So called "self sprocketing" systems are therefore feasible in phase modulation systems. These are systems in which the information signals are used to generate the sprocket signals, which may also be referred to as timing signals.

In a phase modulation system of the type mentioned, the original signals recorded on the recording medium generally pass through various stages during a reading operation to convert the recorded information into pulses which represent either a "1" or a "0". In passing through these various stages, so called "non-significant" pulse signals are produced. Non-significant pulse signals may be produced whenever the pattern of signals include two consecutive similar type information signals, for example, two consecutive "0"s or two consecutive "1"s. Under these conditions, the information signals pass through zero at points of time other than the middle of the digit periods, in addition to passing through at the middle of the digit periods. These points of time are generally the beginning of the digit periods.

Since only the zero cross over points at the middle of the digit periods are used to recover true information signals, other generated signals or pulses which have the same characteristic as information signals are considered non-significant or spurious signals and must be eliminated before the information may be applied to subsequent circuits.

While some so called self sprocketing systems have been used in the past, many such systems have proven to be unsatisfactory when the speed of the recording medium during a reading operation varies to thereby cause the time intervals of the information signals to vary. The disadvantages arising from a variable speed of a recording medium, while often not too serious in the case of a drum storage device rotating at a relatively constant speed, do become serious problems in reading operations involving a tape where large speed variations are generally present.

It is an object of this invention to provide an improved circuit for producing timing signals from recorded information signals.

It is a further object of this invention to provide an improved circuit for reading binary information signals from a magnetic recording medium.

It is still a further object of this invention to provide an improved circuit for eliminating non-significant signals from a generated information wave train.

It is still a further object of this invention to provide an improved circuit for producing timing signals and eliminating non-significant signals when variable speeds of a recording medium are encountered.

In accordance with the present invention, a circuit for reading binary information signals from a magnetic recording medium is provided. The binary information signals are converted into a train of pulse signals which may include non-significant signals. The train of pulse information signals and the spurious signals are applied to an input gate circuit. The information signals from the gate circuit are applied to trigger a delay flop circuit, which produces an inhibitory signal of a predetermined or variable duration. The inhibit signal produced is applied to the input gate circuit to inhibit the passage of the spurious pulse signals. The duration of the inhibit signal is such that information signals are permitted to pass through the gate circuit. The information signals, free of the spurious signals, may then be applied to subsequent utilization circuits.

Other objects and advantages of the present invention will be apparent to those skilled in the art to which the present invention is related from a reading of the following specifications and claims, in conjunction with the accompanying drawings, in which:

Figure 4:
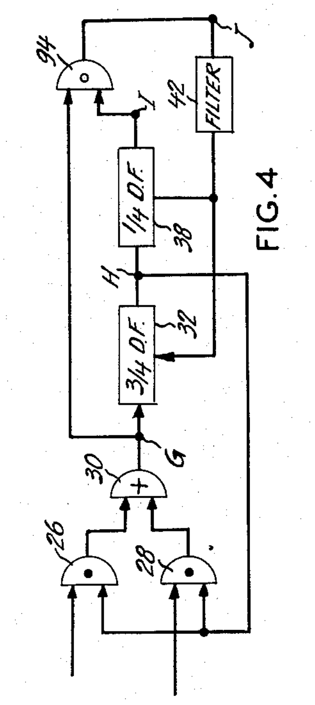
Figure 5:
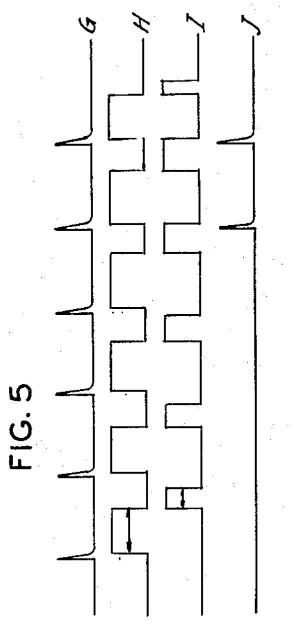
Figures 3A, 3B:
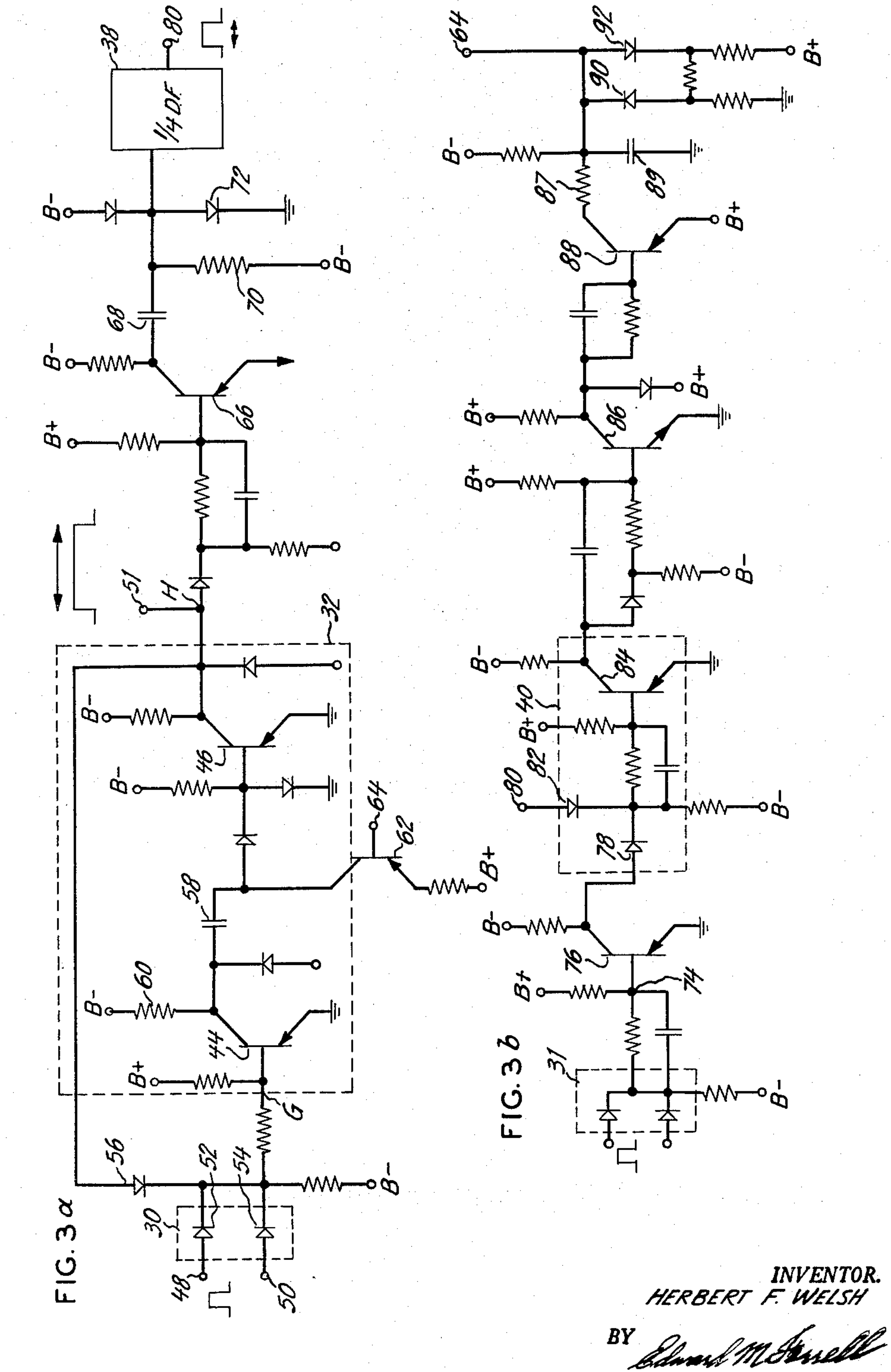

FIGURES 3*a* and 3*b* are schematic diagrams illustrating the main circuit details illustrating in detail some of the features of the present invention;

FIGURE 4 is a block diagram illustrating another form of the present invention, and FIGURE 5 is a group of waveforms illustrating a series of electrical signals related to the block diagram of FIGURE 4.

Figure 1:
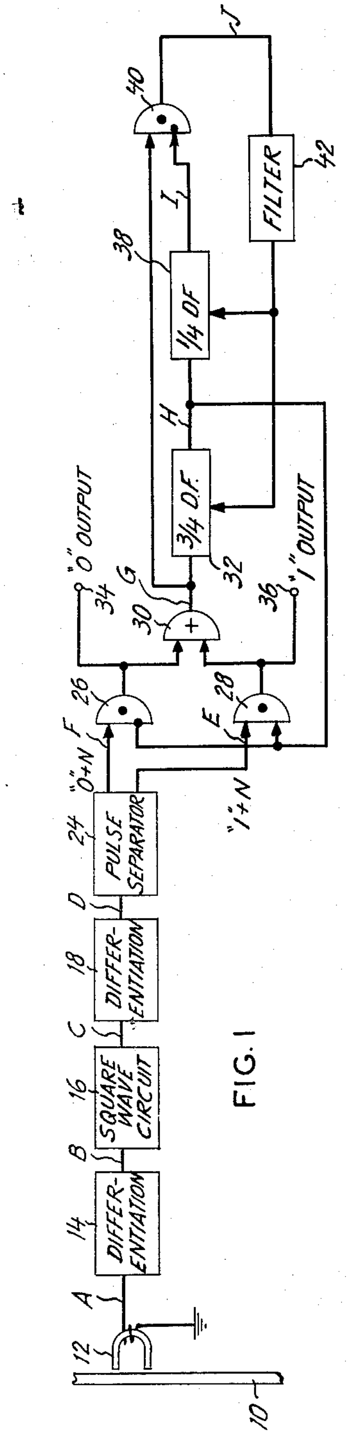
FIGURE 1 is a block diagram illustrating one form of the present invention.
Figure 2:
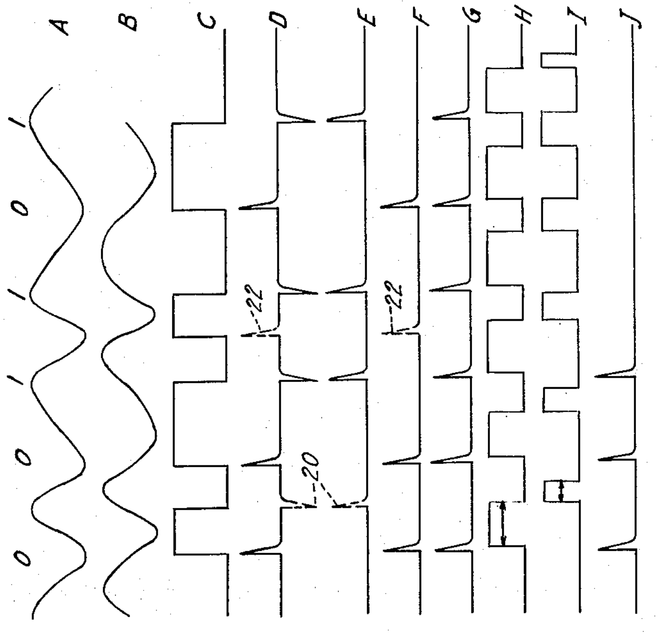
FIGURE 2 is a group of waveforms illustrating a series of electrical signals related to the block diagram of FIGURE 1, presented for purposes of explanation.

Referring to FIGURES 1 and 2, binary information signals to be read may be recorded on a recording medium 10. This recording medium, for example, may be a magnetic tape. The information from the recording medium 10 produces an electrical signal in a reading head 12. The signal read out by the reading head 12 is illustrated in FIGURE 2 by a waveform A. In the example illustrated, the information comprises a series of digits 001101.

The output signals from the reading head 12 are applied to a form of differentiator circuit 14 which produces signals illustrated by the waveform B. The signals of waveform B are delayed approximately 90 degrees. The differentiator circuit 14 delays the signals represented by the waveform A so that the zero cross over points coincide with the peaks of the signals represented by the waveform A. Signal delay circuits are well known to those skilled in the art and therefore are not described or shown in detail.

The output signals from the differentiator circuit 14 are applied to a square wave generator circuit 16 which produces output signals corresponding to the waveform C. The square wave generator circuit 16 may be a form of Schmitt trigger circuit or other such conventional circuit for converting sine wave signals into square wave signals.

The output signal from the square wave generator circuit 16 is applied to a second differentiator circuit 18 to produce signals represented by the waveform D. This differentiator circuit may comprise a conventional resistor-capacitor type network which produces pulse signals for each change in direction of applied square wave signals.

The waveform C may correspond in polarity to the signal waveform originally recorded. A "0", in the embodiment illustrated, may be represented by a signal generated when the direction of a signal of waveform C is moving in the positive direction at the zero cross over point. Likewise a "1" may be represented by a signal generated when the change in direction of a signal of waveform C is moving in the negative direction at the zero cross over point.

When two consecutive information signals have the same characteristic, that is both represent either a "0" or a "1" type of information signal, pulse signals are produced which do not actually represent true information. These signals may be considered spurious or non-significant pulses. These spurious pulse signals are represented by pulses 20 and 22 illustrated in FIGURE 2 by dotted lines in the waveform D.

The output signal from differentiator circuit 18, represented by the waveform D, is applied to a pulse separator circuit 24 to produce a series of signals at points E and F, represented in FIGURE 2 by the waveforms E and F. The pulse separator circuit 24 separates the pulse signals of one polarity from pulse signals of the opposite polarity. Such a circuit may include, for example, a diode arrangement or various other types of circuits, such circuits being well known to those skilled in the art.

The signal waveform F includes the non-significant pulse signal 22 as well as the pulse signals representing "0"s. Likewise, the waveform E includes the non-significant pulse signal 20 as well as the pulse signals representing "1". Since the non-significant pulses 20 and 22 do not represent true information, it is necessary that they be suppressed before passing the information pulse signals to subsequent utilization circuits in a computer, for example.

The output signal from the pulse separator circuit 24 from points F and E are applied to a pair of gate circuits 26 and 28, respectively. The gate circuit 26 receives the signals at point F, which have the characteristic of "0" information pulses, including the non-significant pulse signal 22. The gate circuit 28 receives the pulse signals from point E, which includes the "1" information signals, as well as the non-significant pulse signal 20 which has the same characteristic as the "1" information signal.

When output signals from the gate circuits 26 and 28 are developed, they are applied to an OR gate circuit 30 which acts as a buffer stage for the information signals. All the information signals illustrated by the waveforms E and F are combined to produce a series of signals represented by the waveform G. It is noted that waveform G does not include the non-significant pulse signal 20 or 22. The means for eliminating these non-significant or spurious signals, which relates to one of the main features of the present invention, will be described.

The output signals from the OR gate 30, represented by the waveform G, are applied to a delay flop circuit 32, illustrated by way of example as being a three quarter delay flop circuit. The delay flop circuit 32 produces an output signal at point H corresponding to the waveform H. In the embodiment illustrated, the signal at point H is variable in duration and is illustrated as being variable from approximately one half a digit period to approximately three quarters of the duration of a digit period. The output signal at point H provides an inhibitory signal for the gate circuits 26 and 28. The waveform H is illustrated as being a positive polarity although it is apparent that the polarities of all the waveforms shown are merely illustrative.

During the time that the signals at point H are positive, any pulse signals applied to the gate circuit 26 or 28 from points E and F are inhibited or prevented from passing therethrough. When the time relationships of the signals illustrated by the waveforms E and F are compared with the signals of waveform H, it is seen that the information signals which are used to trigger the delay flop 32 pass through the gate circuits 26 and 28, since these information signals appear slightly before the time that the inhibit signal is applied to the gate circuits 26 and 28. However, spurious pulse signals 20 and 22 occurring during the inhibit signal periods, are prevented from passing through the gate circuits. This operation is based on the assumption that proper synchronizing signals have started the proper operation of the system illustrated, as will be described.

Information pulses representing "0" are then applied from the gate circuit 26 to an output terminal 34. Likewise, information pulses representing "1" are applied from the gate circuit 28 to an output terminal 36. No spurious signals appear at either of the output terminals 34 or 36. The output terminals 34 and 36 may be connected to various utilization circuits within a computer system.

In situations where the digit period is maintained constant, the system thus far described which may include a delay flop which produces an inhibit signal of a fixed three quarter duration of a digit period is often adequate. However, when the digit time period varies over a wide range, a delay flop circuit producing an inhibit signal of fixed duration is inadequate and will not suppress spurious pulse signals. One such case which involves variable digit periods may, for example, be a magnetic tape recording system, especially when such tapes are being brought to full speed from a still position.

In order to overcome some of the disadvantages of a fixed delay flop circuit in systems involving a variable speed recording medium, the present invention provides means for varying duration of the inhibit signals from the delay flop circuit 32. The output signals at point H from the delay flop circuit 32 are applied to a second delay flop circuit 38, illustrated as being a one quarter delay flop, to produce signals represented by a waveform I. When the output signals from the delay flop 32 drops towards a negative direction, the delay flop 38 is triggered to produce positive output signals at point I. The output signals from the delay flop 38 may also be variable. When the durations of the delay flop circuits 32 and 38 are made variable, the total combined duration of the signals at points H and I are designed to have a maximum duration of one digit period. For example, when the signal at point H has a maximum time duration of approximately a three quarter digit period, the signal at point I will have a maximum duration of approximately one quarter of a digit period. The minimum duration of the signal at point H may be approximately one half a digit period, with the minimum duration of the signal at point I being one third that of the signal at point H.

The output signal from the delay flop 38 is applied to an inhibit gate circuit 40. Information pulses from the OR gate circuit 30 at point G are also applied to the inhibit gate circuit 40. When the total duration of the signals at points H and I is less than one digit period of the information signals, output signals will be developed at the output circuit of the inhibit gate 40. These output signals are represented by the waveform J. In order for output pulses to be developed at point J, a zero or negative voltage signal level from point I must be applied to the inhibit gate 40 simultaneously with a pulse signal from point G. If the delay time or the total signal duration produced by the delayed flops 32 and 34 becomes equal or greater than one digit period, no output signal is developed by the inhibit gate circuit 40 at point J.

Thus a positive signal at point I may be said to inhibit signals from passing through the inhibit gate 40.

As has been mentioned, the output signals from the delay flop circuits 32 and 38, which will be described in detail in connection with FIGURES 3*a* and 3*b*, are designed to be variable in duration. As previously indicated, when the total duration of the delay flop output signals is less than one digit period, pulse signals are developed at point J which are applied to a filter circuit 42. The filter circuit 42 is connected in such a manner so as to produce a direct current voltage to control the operation of the variable delay flops 32 and 38. For example, one such way in which the output signals may be controlled is by varying the voltage associated with the electrical elements which determine the duration of the signals generated. Control of the voltage associated with these elements, which may include a resistive-capacitive network, by signals from the filter circuit 42 is employed to lengthen the durations of the signals from both of the delay flop circuits 32 and 38 up to a total duration of one digit period. As long as the total duration of the signals from the delay flops 32 and 38 is less than one digit period, pulse signals will be developed at point J. When the total duration is equal to or exceeds one digit period, however, no pulse signals are developed at point J. This results in the shortening of the durations of the pulse signals from both delay flops.

Thus, if the duration of the delay flops are made variable, the delay flop 32 produces an inhibitory signal which is variable in duration from approximately one-half a digit period to three-quarters of a digit period. Ideally, it is desirable to keep the signal from the flip flop 32 just greater than one half a digit period, which is of sufficient duration to eliminate spurious signals. The duration of the signal from the delay flop 38 varies in the same ratio as the signal from the delay flop 32, the signal from the delay flop 38 being approximately one-third the duration of the signal from flip flop 32. It is seen that every time a full delay is attained by the two delay flop circuits that the absence of an output signal from the filter 42 tends to decrease the durations of the signals from the flip flops.

Referring particularly to FIGURE 3*a*, some of the main elements of FIGURE 1 are shown schematically in detail. The variable delay flop 32 includes a pair of transistors 44 and 46. Operating potentials are provided by conventional means to normally maintain the transistor 44 in a normally "on" or conducting condition. The transistor 46 is biased so that it is in a "off" condition or non-conducting condition.

"0" information signals may be applied from a input terminal 48 through a diode 52 which is included in the OR circuit 30. "1" information signals are applied from an input terminal 50 through a diode 54 which is also included in the circuit 30. The OR gate circuit 30 comprises the diodes 52 and 54, but may of course include elements other than diodes which are capable of operating an OR gate circuit.

The signals at point G, which include both "0" and "1" information signals, are applied from the OR circuit 30 to the base of the transistor 44. These signals cause the transistor 44 to switch from a normally conducting state to a non-conducting state. The signal developed at the collector of the transistor 44 is applied through a coupling capacitor 58 to the base of the transistor 46, which is in a normally non-conducting state. A feed back network from the collector of the transistor 46 to the base of the transistor 44 includes a diode 56. The feedback network causes the transistor 44 to be driven to cut off or to a non-conducting state almost instantaneously. Likewise, when the transistor 44 becomes cut-off, the transistor 46 is driven to saturation almost instantaneously.

When the transistor 44 is conducting, the capacitor 58 is normally discharged to a predetermined voltage level and charges to a higher voltage when the transistor 44 becomes non-conducting. The rate of charge of the capacitor 58 to a higher voltage is dependent upon the time constant of the capacitor 58, a resistor 60 and various other elements which may be associated with the capacitor 58.

After the voltage at the capacitor 58 has risen to a predetermined level after the transistors 44 and 46 have been switched, the transistor 46 is switched back to an "off" condition and the transistor 44 is switched back to an "on" condition. As a result of the switching actions of the transistors 44 and 46, square wave signals, represented by the waveform H of FIGURE 2, are developed at the collector of the transistor 46. These are the signals which are used as an inhibit signal to prevent spurious or non-significant pulses from passing through the gate circuits 26 and 28 of FIGURE 1. These signals may be applied to the gate circuits 26 and 28 through an output terminal 51.

With pulse signals being applied to the filter 42 (FIGURE 1), the voltage level controlling the charge time of the capacitor 58 will cause the width of the signal at point H to increase in duration. The signal produced at points H and I will continue to increase in duration until once more the inhibit gate circuit 40 receives a positive signal from the delay flop 38 simultaneously with the application of an information pulse from the OR gate 30 (FIGURE 1). At this point when the voltage from the delay flop circuit 38 at point I is positive, no pulses are generated by the circuit 40 and the process described is repeated.

It is therefore seen that the transistor 62 not only provides a constant current source for the capacitor 58 but, in addition, provides means for providing a variable voltage level. A variable voltage applied to the capacitor 58 from the transistor 62 results in output signals of variable duration being generated by the flip flop circuit 32. It has been seen that pulse signals, such as a direct current voltage resulting from those represented by the waveform J, are applied to the base of the transistor 62 through an input terminal 64. These pulse signals result in a change in the voltage level at the collector of the transistor 62 to thereby control the voltage at the capacitor 58.

When direct current signals are applied to the terminal 64, indicating that the total duration of the signals from flip flops 32 and 38 exceed a full digit time, the voltage controlling the action of the capacitor 58 causes the width of the signals from the delay flops 32 and 38 to diminish. The reason for this is that the voltage at capacitor 58 causes the transistors 44 and 46 to reswitch sooner to their original operating states.

It is noted that the circuits illustrated for generating clock pulses at point G from a train of information digit signals of the type described may not be correct until a digit signal of one type is received following a digit signal of the other type. It is therefore desirable to make sure that the arrangement is working correctly before a train of signals is applied. This may be accomplished by applying a train of signals such as 101010. The succession of digit signals alternatively of one type and then another type insures that the timing of the arrangement will be correct. If these initial signals were not sent, it is conceivable that spurious pulse signals would control the inhibit gating signals produced by the delay flop circuit 32.

The output signals from the delay flop 32, represented by the waveform H, are applied to the base of a transistor 66. The transistor 66 is operated as a conventional amplifier to produce an output signal at its collector. The output signal developed at the collector of the transistor 66 is substantially the same as the input signal except for phase reversal.

The output signal from the collector of the transistor 66 is applied to a differentiator network comprising a capacitor 68 and a resistor 70. The output signal developed by the differentiator circuit include a series of positive and negative going pulses. The negative going pulses are eliminated by the action of a diode 72 in a conventional manner. The positive pulses are applied to trigger the delay flop circuit 38.

Since the output signals produced by the delay flop circuits 32 and 38 are substantially the same except for the durations of the signals generated, the delay flop circuit 38 may be substantially the same as the delay flop circuit 32, with the exception of the values of the charging capacitor. For example, the capacitor 58 in the delay flop circuit 32 may be about 4700 microfarads and substantially higher in value, in the order of two and one half times as much, than the capacitor in the delay flop circuit 38. The exact values of the capacitors, as well as other associated elements, are chosen so that the total duration of the signals produced may be made variable, for example, from three quarters to a full digit period.

The delay flop circuit 38 is triggered by the pulse caused by the trailing edge of the square wave output signal from the delay flop circuit 32. In the embodiment illustrated, the delay flop circuit 38 is designed to produce a variable ouput square wave which is substantially one third the variable width of the square wave generated by the delay flop 32.

Referring particularly to FIGURE 3*b*, information signals representing "1"s and "0"s are applied to an OR circuit 31, which in some cases, may be the same OR circuit 30. For purposes of clarity two OR circuits are illustrated rather than the single OR circuit 30 of FIGURE 1. The circuit illustrated in FIGURE 3*b* is normally connected to the circuit illustrated in FIGURE 3*a*. The circuits are shown separated for purposes of clarity and explanation. Pulse signals, as represented by the waveform G, are developed at the point 74 and applied to the base of a transistor 76. The transistor 76 is a conventional amplifier and produces an amplified signal at its collector electrode. The inhibit gate circuit 40 includes a pair of diodes 78 and 82. Pulse signals including the combined "1" and "0" information pulses, as represented by waveform G, are applied to the diode 78. Output signals from the delay flop 38, which may be considered as voltage levels, are applied from a terminal 80 to the diode 82. The terminal 80 may be connected to the terminal 51 of FIGURE 3*a*. The combination of the two diodes 78 and 82, together with a transistor 84, may be considered as the inhibit gate circuit 40 illustrated by a block in FIGURE 1. The signal at terminal 80 is a direct current voltage signal resulting from the pulse signals represented by the waveform I.

The output signal from the diodes 78 and 82 is applied to the base of the transistor 84. The transistor 84 is in a normally "off" state. When the signals applied to the diodes 78 and 82 are both positive, the transistor 84 will remain in an "off" condition. When the signal applied to the diode 82 is not positive, however, the transistor 84 is switched to an "on" condition to produce an output signal at its collector. The output signal from the transistor 84 is applied to the base of a transistor 86, which functions as a conventional amplifier to produce a phase inverted signal at its collector.

The output signal from the collector of the transistor 86 is applied to the base of a transistor 88, which also serves to amplify and convert the applied signal. The circuitry associated with the collector of the transistor 88 may be considered as the filter 42, which may include a resistor 87 and a capacitor 89 as well as other elements. The filter 42 is illustrated by a block in FIGURE 1. Pulses are applied to the filter circuit, as illustrated by waveform J.

The capacitor 89, together with the diodes 90 and 92 provide means for producing a direct current voltage from the pulse signals applied thereto. The resulting direct current voltage is applied to the terminal 64.

The voltage at the terminal 64 is applied to the capacitor which may be associated with the delay flop circuit 38. Control of the voltage applied to the capacitors associated with the delay flop circuits 32 to 38 controls the width or duration of the signals generated by these two circuits in a manner previously described.

It has been seen that the gating circuit 40, which includes the transistor 84, permits a signal to pass therethrough only when a signal representing the absence of a positive voltage level is applied to the terminal 80. A positive signal will be applied to the terminal 80 only when the total time delay of the two generated delay signals is equal to or greater than one digit period. Therefore, when the total delay time is less than one digit period a direct current voltage signal will be generated at the terminal 64.

Referring particularly to FIGURE 4, another embodiment of the present invention is illustrated. Much of the operating and circuits are similar to the system illustrated and described in connection with FIGURE 1. Only the essential difference between FIGURE 1 and FIGURE 4 will be described.

The main difference between the embodiments of FIGURES 1 and 4 involves the use of an AND gate circuit 94 in FIGURE 4 which functions differently than the AND gate circuit 40 of FIGURE 1. In the embodiment of FIGURE 4, the positive output signal or voltage level from the delay flop circuit 38 permits the passage of information pulse signals therethrough until a positive signal is developed by the delay flop 38. The AND gate circuit 94 produces an output signal whenever a pulse is received from the OR gate circuit 30 and the output signal from the delay flop 38 is positive. Under these conditions, output signals from the AND gate circuit 94 are applied to the filter 42 as long as the total duration of the signal from flip flops 32 and 38 exceed one digit period.

Output pulse signals from the filter 42, when they are developed, are applied to the capacitors in the delay flop circuits 32 and 38 to thereby vary the durations of the signals generated by the flip flops to be reduced to a predetermined minimum. After the signal durations of the flip flops have dropped to a minimum, they then gradually increase in duration until the output signal from the delay flop 38 again becomes positive at the same time that an information pulse signal is received from the OR gate 30. At this point, output signals are again produced at the output circuit of the AND gate circuit 94, this condition indicating that the total duration of the delay flop signals is again equal to or greater than one digit period.

Referring to FIGURE 5, waveforms H and I are similar to those illustrated in FIGURE 2. However, the waveform J is different. Whereas in FIGURE 2, pulses appeared wherever the total durations of the signals from flip flops 32 and 38 was less than one digit period, the embodiment of FIGURE 4 operates differently. In FIGURE 4, pulses are produced at point J whenever the total duration of the signals from flip flops 32 and 38 is equal to or greater than one digit period. The particular arrangement used, i.e., the embodiment of FIGURE 1 or FIGURE 4, depends upon the particular system requirement.

Most of the circuitry used in the embodiment of FIGURE 4 could be substantially similar to that illustrated in FIGURES 3*a* and 3*b*. Various operating potentials of the transistors would, of course, be different. The manner in which the capacitor 58, for example, is made to charge and discharge would of course require some changes in circuitry, such changes being apparent to those skilled in the art.

It is noted that the present invention is directed to features and operations which occur in connection with and subsequent to the gate circuits 26 and 28. Various other circuits, such as differentiators, square wave circuits and pulse separators have been illustrated by blocks in order to illustrate a complete system involving a reading operation. It is apparent, however, that the present invention may be used in connection with any system where non-significant pulses are developed and must be suppressed.

While the writing operation has been described in general terms in the introduction for purposes of clarity, it is recognized that the present invention is not particularly related to any one type of writing system. The present invention may be used in conjunction with any writing system where a subsequent reading operation produces non-significant pulses. The present invention is particularly applicable to tape recording reading systems in which the tape may operate at variable speeds, especially when the system is being started.

It is noted that pulse signals developed at point J are of fixed duration and the same width as the information pulses. It is conceivable that these pulses be of variable duration in accordance with the digit period in order to produce faster response of the filter circuit 42 to assure that the system will be ready for a reading operation in a shorter period of time. The pulses at point J may also be used to control other circuits, such as a flip-flop, for example, which in turn, may produce different types of signals or changes in voltage levels to affect the operation of the filter circuit 42 to attain faster response.

What is claimed is:

1. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic and having a recording medium of variable speeds, a system for eliminating said non-significant signals from a train of information signals comprising means for producing a signal of variable duration in accordance with the time period between information signals, and means for utilizing said signal of variable duration to eliminate said non-significant signals.

2. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic and having a movable magnetic tape of variable speeds, a system for eliminating said non-significant pulse signals from a train of information signals comprising means for producing a signal of variable duration in accordance with the time period between information signals, and means for utilizing said signal of variable duration to eliminate said non-significant pulse signals.

3. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic and having a movable magnetic tape of variable speeds wherein a reading operation produces said non-significant and information pulse signals, a system for eliminating said non-significant pulse signals from said information pulse signals comprising means for producing a signal of variable duration in accordance with the time period between information pulse signals, and means for utilizing said signal of variable duration to eliminate said non-significant pulse signals.

4. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic, a system for eliminating non-significant signals from a train of information signals comprising a gating circuit, means for applying said non-significant and information signals to said gating circuit, means for producing inhibit signals of a variable duration greater than one half and less than the full time period between said information pulse signals, and means for applying said inhibit signals to said gating circuit to prevent said non-significant pulse signals from passing through said gating circuit.

5. In a phase modulation read out system wherein recorded information signals are normally separated in time by one digit period and are translated into a series of pulse signals representing "1" and "0" bits of information and include non-significant pulse signals between two bits of information whenever said two bits of information are of the same characteristic, a system for eliminating non-significant signals from a train of information signals comprising means for producing a signal of variable duration, and means for utilizing said signal of variable duration to eliminate said non-significant signals.

6. A system for eliminating non-significant pulse signals from a train of information pulse signals comprising a gating circuit, means for applying said non-significant and information pulse signals to said gating circuit, a utilization circuit, means for applying the output signals from said gating circuit to said utilization circuit, a circuit for producing inhibitory gate signals variable in duration within a range between one half and the full time period of said information pulse signals, and means for applying said inhibitory gate signals to said gating circuit to prevent said non-significant pulse signals from passing through said gating circuit to said uitilization circuit.

7. A system as set forth in claim 6 wherein a control circuit is provided to control the duration of the inhibitory gate signals produced by said circuit for producing inhibitory gate signals.

8. A circuit for reading binary information signals from a magnetic recording medium, means for converting said binary signals into a pulse train of signals including pulse signals representative of said binary information signals and non-significant pulse signals, a gating circuit, means for applying said pulse train of signals to said gating circuit, a signal generator for generating a signal of variable duration, means for applying said binary information signals from said gating circuit to trigger said signal generator to produce said signal of variable duration, means for applying said signal of variable duration to said gating circuit to inhibit said non-significant pulse signals from passing through said gating circuit and to permit said information signals to pass therethrough, a utilization circuit, and means for applying said information signals from said gating circuit to said utilization circuit.

9. A system as set forth in claim 8 wherein the duration of said inhibitory gate signals is variable between one half and three quarters of the full time period between information signals.

10. A circuit for reading binary information signals from a recording medium comprising means for converting said binary signals into a series of pulse signals representative of information and spurious pulse signals, a gating circuit, means for applying said series of pulse signals to said gating circuit, a signal generator for generating an inhibit signal variable in duration between greater than a half and less than a full binary signal period, means for applying said binary information signals from said gating circuit to trigger said signal generator to produce said inhibit signal, means for applying said inhibit signal to said gating circuit to inhibit the passage of said spurious pulse signals therethrough and to permit the passage of said information signals, a utilization circuit, and means for applying said information signals from said gating circuit to said utilization circuit.

11. A system for eliminating non-significant signals from a train of information signals comprising a gating circuit, means for applying said non-significant and information signals to said gating circuit, a delay flop circuit for producing inhibitory gate signals of a variable duration greater than one half and less than the full time period between said information signals, and means for applying said inhibitory gate signals to said gating circuit to prevent said non-significant pulse signals from passing through said gating circuit.

12. A system as set forth in claim 11 wherein a second delay flop circuit is provided to produce a signal, the total duration of the signals produced by said delay flop circuit and second delay flop circuits being variable from more than one half and no greater than the full time period between information signals.

13. A system as set forth in claim 12 wherein means are provided to reduce the durations of the signals from said delay flop circuit and second delay flop circuits whenever the total duration of said signals equal or exceed one full time period between information signals.

References Cited by the Examiner

UNITED STATES PATENTS

| | | | |
|---|---|---|---|
| 2,961,649 | 11/1960 | Eldredge et al. | 235—61.11 |
| 3,001,176 | 9/1961 | Ingham | 340—146.1 |

DARYL W. COOK, *Examiner.*

W. S. POOLE, *Assistant Examiner.*

MALCOLM A. MORRISON, *Primary Examiner.*